United States Patent [19]

Yokozawa

[11] Patent Number: 5,007,015
[45] Date of Patent: Apr. 9, 1991

[54] PORTABLE COMPACT DEVICE

[75] Inventor: Yukio Yokozawa, Nagano, Japan

[73] Assignee: Seiko Epson Kabushiki Kaisha, Tokyo, Japan

[21] Appl. No.: 259,469

[22] Filed: Oct. 17, 1988

Related U.S. Application Data

[63] Continuation of Ser. No. 792,712, Oct. 30, 1985, abandoned.

[30] Foreign Application Priority Data

Nov. 6, 1984 [JP] Japan .................................. 59-233881
Aug. 28, 1985 [JP] Japan .................................. 60-188786

[51] Int. Cl.⁵ .................................................. G06F 3/00
[52] U.S. Cl. .................................. 364/900; 364/927; 364/926.92; 364/944.92; 364/705.07; 364/709.06
[58] Field of Search .............................. 364/705, 709

[56] References Cited

U.S. PATENT DOCUMENTS

| | | | |
|---|---|---|---|
| 4,005,388 | 1/1977 | Morley et al. ........................ | 364/900 |
| 4,125,871 | 11/1978 | Martin .................................. | 364/900 |
| 4,143,417 | 3/1979 | Wald et al. ............................ | 364/900 |
| 4,364,112 | 12/1982 | Onodera et al. ..................... | 364/200 |
| 4,402,056 | 8/1983 | Sado et al. ........................... | 364/705 |
| 4,534,012 | 8/1985 | Yokozawa . | |

OTHER PUBLICATIONS

Williams, "The Panasonic and Quasar Hand-Held Computers", Jan. 1981, *Byte*, pp. 34-45.

*Primary Examiner*—Gareth D. Shaw
*Assistant Examiner*—Christina M. Eakman
*Attorney, Agent, or Firm*—Blum Kaplan

[57] ABSTRACT

A portable compact device for use with an external device. The portable compact device includes an interface circuit for providing an interface between an external device and the portable compact device. A data memory circuit stores data received by the interface circuit. A control circuit coupled to the data memory circuit processes data stored in the data memory circuit in accordance with a stored data structure. A data modifying circuit is coupled to the data memory circuit for modifying the stored data. A data structure initializing circuit insures that the structure of the stored data in the data memory circuit allows the control circuit to process the stored data.

15 Claims, 6 Drawing Sheets

PORTABLE COMPACT DEVICE

This is a continuation of application Ser. No. 06/792,712, filed on Oct. 30, 1985, now abandoned.

BACKGROUND OF THE INVENTION

The invention is generally directed to a portable compact device having a data interface for interfacing with an external information device, and in particular to the initialization of the contents of a data memory device in the portable compact device.

In general, there have been an absence of portable devices having data interfaces with external information devices until the present inventor introduced one disclosed in U.S. Pat. No. 4,534,012 entitled Portable Programmable Information Device and External Programming Station, which issued on August 6, 1985.

Reference is made to FIGS. 1 and 2 wherein simplified schematic drawings of the structure of the portable device constructed in accordance with the teachings of Pat. No. 4,534,012 are depicted. In FIG. 1, the data from the external device (not shown) passes through data input circuit 120 and is stored in memory circuit 121. Input data is then processed by center controlling circuit 122 as memo data, scheduled alarm data, alarm time data, machine language data (programming) and so forth, depending upon the type of information included in the input data. The data input from the external device is input in accordance with a predetermined data structure. By inputting data in accordance with this predetermined structure the portable device can be externally controlled. In addition, by inputting data through a keyboard 123 the input data can be modified. The input data may be displayed by a display circuit 124 or output to an alarm circuit 125.

However, the structure shown in FIG. 1 has a major problem. When no data is input from the external device, such as during the changing of batteries, the data is not processed by center controlling circuit 122, nor can it be modified by inputting data from a keyboard input 123. This is because a change in the data structure in memory circuit 121 does not enable center controlling circuit 122 to process the data stored in memory circuit 121.

Reference is now made to FIG. 2 wherein another schematic diagram of the portable device disclosed in U.S. Pat. 4,534,012 is depicted. In FIG. 2, the data from the external device (not shown) passes through input circuit 160 and is stored in memory circuit 161. The input data is then processed by center controlling circuit 162 in accordance with the data type indication contained in the input data. The data type indication is representative of the type of data, such as alarm data or memo data contained in input data. The input data types include, for example, memo data such as telephone numbers, addresses, and words, and scheduled alarm data which includes alarm time data and alarm comment data (which is displayed when the time coincides with the alarm-time data). In addition, the input data can include world time data which consists of place-name data and time difference data between a given place-name and a reference location. The input data may also include programming data for programming the operation of center controlling circuit 162.

Center controlling circuit 162 attempts to identify the type of data being input into the data input circuit 160 and, based on that information will properly process the data. In order to process the data at high speeds and with low electrical power usage, the structure of the input data is preset so as to include an indication of the type of data being transmitted. In addition, the data can be changed by way of a key input circuit 163.

However, the portable device described above has a major problem. If the data structure of the data stored in memory circuit 161 is different from the predetermined data structure, center controlling circuit 162 is unable to process the stored data. This type of problem can occur when the data input from the external information device is garbled or otherwise not accurately transmitted. In addition, changing the batteries can cause such a problem. When the structure of the data stored in memory circuit 161 is different from the proper data structure, the data stored in memory circuit 161 is not capable of being either processed by center controlling circuit 162 or corrected by key input circuit 163.

Accordingly, there is a need for a portable compact device in which a predetermined data structure is stored in the memory circuit and the data stored may be modified so it can be processed by the control circuit. There is also need to provide a predetermined data structure so that additional data may be entered in accordance with the predetermined data structure from a key input device without utilizing any external device. There is a further need for data to be entered from the key input even if the data structure stored in the memory circuit has been destroyed.

SUMMARY OF THE INVENTION

The invention is generally directed to a portable compact device. The portable compact device includes an interface circuit for providing an interface between an external device and the portable compact device. A data memory circuit stores data received by the interface circuit. A control circuit coupled to the data memory circuit processes data stored in the data memory circuit in accordance with a stored data structure. A data modifying circuit coupled to the data memory circuit is designed to modify the stored data. A data structure initializing circuit insures that the data structure in the data memory circuit allows the control circuit to process data stored in the data memory circuit. The data structure initializing circuit allows for the inputting of data to the data memory circuit through the data modifying circuit even when no data is input through the interface circuit. Further, the data structure initializing circuit is capable of detecting changes in the data structure in the data memory circuit from the established stored data structure and correcting the data so that the control circuit may process data stored in the data memory circuit.

Accordingly, it is an object of the instant invention to provide an improved portable compact device which maintains the integrity of the data structure in the data memory circuit.

Another object of the invention is to provide an improved portable device adapted to receive data from an external device and also receive and process data input from a data modifying circuit which may include a key input or keyboard type input.

A further object of the invention is to provide a portable compact device having a stored data structure which insures that problems in data transmission do not affect the structure of the data stored in the device.

Still another object of the invention is to provide a portable compact device which insures that all data stored in the device memory is properly structured for processing by the device's control circuit.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 4:
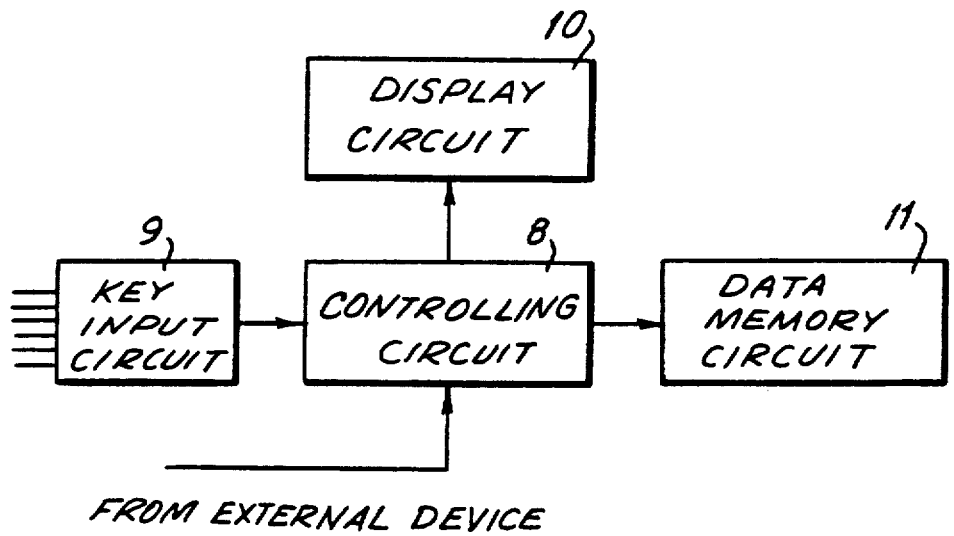
FIG. 4 is a schematic block diagram of the structure of a portable compact device, having the data processing flow-chart of FIG. 3, constructed in accordance with the first embodiment of the invention.

Reference is made to FIG. 4 wherein a block diagram of the internal structure of the portable compact device constructed in accordance with a first embodiment of the invention is depicted. An integrated controlling circuit 8 is utilized to control the functioning of the portable compact device. A key input circuit 9, a data display circuit 10 and a data memory circuit 11 are coupled to controlling circuit 8. Data input from an external device (not shown) is input to controlling circuit 8 and directed to data memory circuit 11 by controlling circuit 8.

Figure 3:
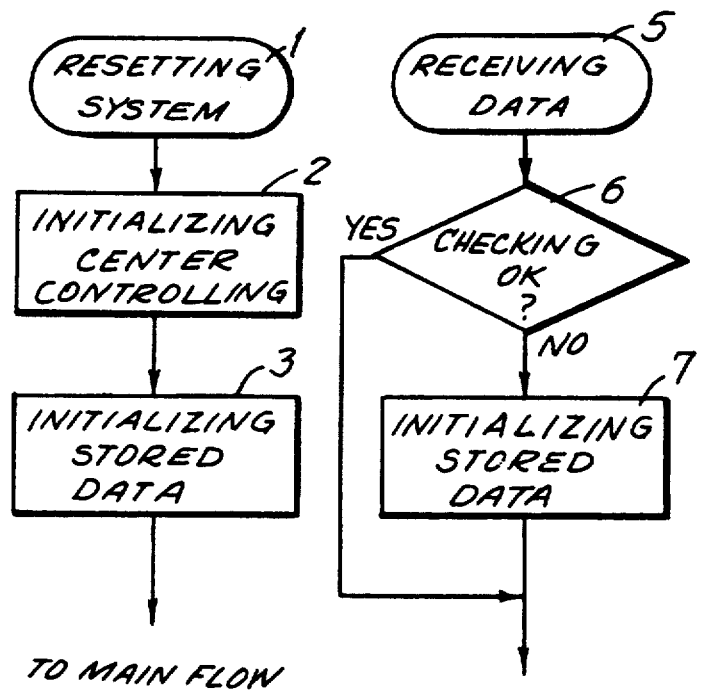
FIG. 3 is a flow chart diagram of the data processing present in a portable compact device constructed in accordance with a first embodiment of the invention.

When the batteries are changed and the new batteries are installed, the system is reset (block 1 in FIG. 3). Next, the data in controlling integrated circuit 8 is initialized (block 2 in FIG. 3). The controlling circuit is initialized with the internal registers and pointers reset as is well known in the art. Finally the data stored in memory circuit 11 is initialized (block 3 in FIG. 3). A similar process takes place when data is received from an external device. An appropriate correction is made when the data input from an external device is cut off prior to completion. The incomplete nature of the data transmission is detected by a checking process (block 6 in FIG. 3). If the checking process determines that the data is incomplete the data in data memory circuit 11 is properly initialized (block 7 of FIG. 3).

By way of example, where the total capacity of data which may be input is eighty channels, the initialized data structure may be established so that data input by key input circuit 9 has ten channels allocated for alarm data, ten channels allocated for world time and sixty channels allocated for memo and other data.

The structure of the data input from the external device after the memory structure is initialized may be freely changed in accordance with the data input so that, for example, all eighty channels may be used for memorandum data or other combinations of the various types of data.

As a result, when the batteries are changed, the data structure stored in the data memory circuit is initialized and data processing thereafter proceeds in the same manner as data is processed when received from an external device. Accordingly, data may be entered and modified from the key input circuit and processed by the controlling circuit independently of the external device.

Figure 9:
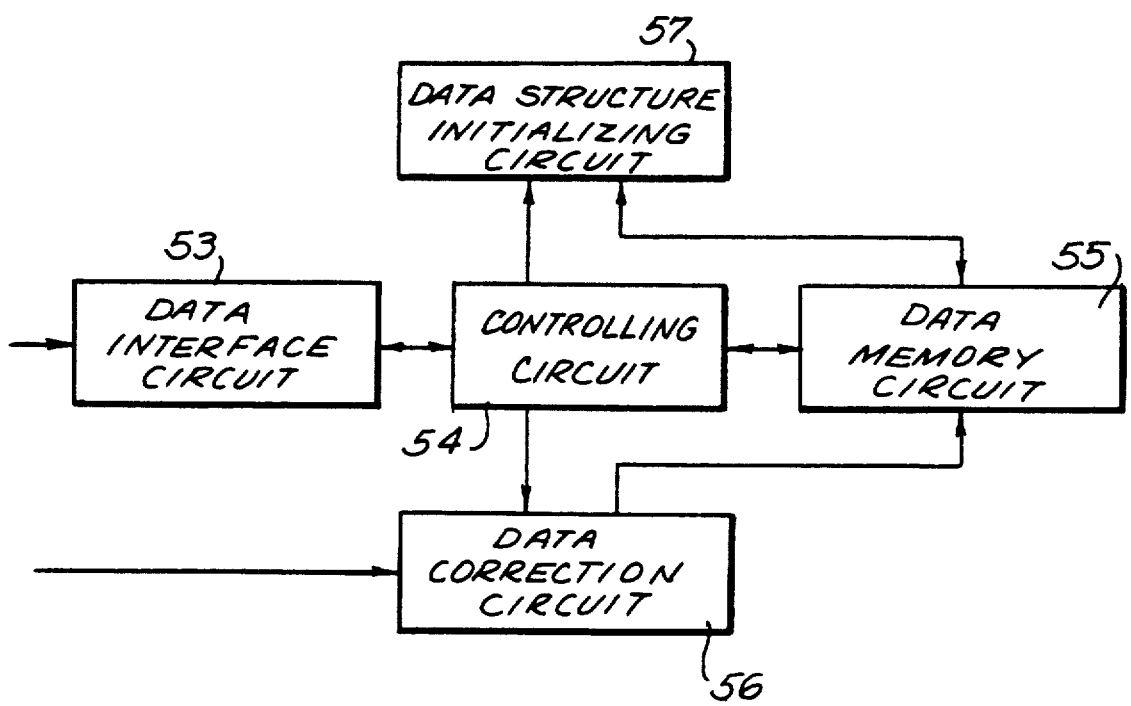
FIG. 9 is a block diagram showing the construction of a portable compact device in accordance with the second embodiment of the invention.

Reference is next made to FIG. 9 wherein a portable compact device constructed in accordance with a second embodiment of the invention is depicted. The device includes a data interface circuit 53 which acts as an interface between an external information processing device (not shown) and the device. A data memory circuit 55 stores data input from the data interface circuit. A controlling circuit 54 processes the input data in accordance with a data structure stored in the data memory circuit 55. The data structure may be stored in a nonvolatile memory device in controlling circuit 54. A data correction circuit 56 corrects the data stored in memory circuit 55. Further, a data structure initializing circuit 57 establishes a proper data structure in data memory circuit 55 when the structure of data stored in data memory circuit 55 differs from the proper data structure as a result of a battery change or imperfect data input termination.

Figure 5:
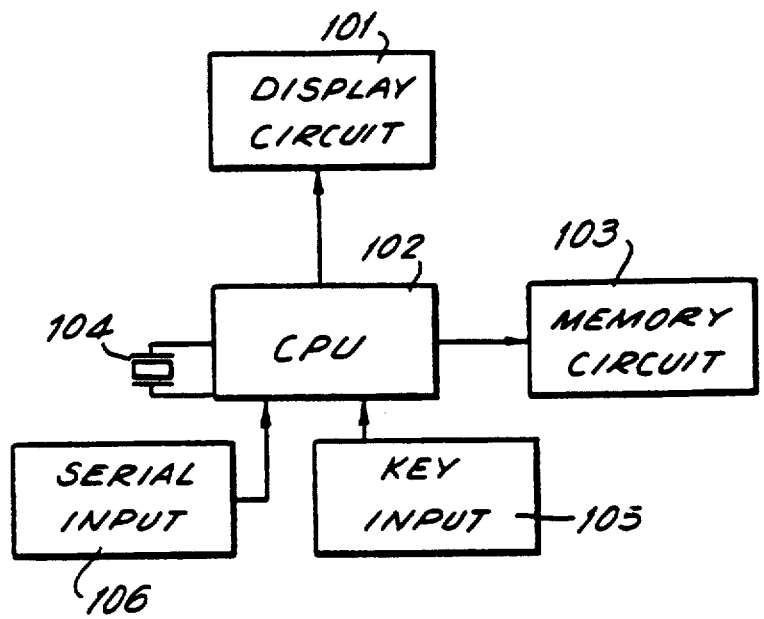
FIG. 5 is a block circuit diagram of a portable compact device constructed in accordance with a second embodiment of the invention.

Reference is next made to FIG. 5 wherein a block circuit diagram of the device of FIG. 9 constructed in accordance with the second embodiment of the invention is depicted. A central processing unit 102 (hereinafter "CPU") is connected to a display circuit 101 and a memory circuit 103. CPU 102 includes a quartz oscillating circuit, including a crystal 104, which outputs a 32 kHz frequency signal, and a counter circuit. As a result, when time data is output to display circuit 101 the device operates as a timepiece. Serial signals 106 from the external information device (not shown) are received by a serial signal receiver circuit in CPU 102 and directly input to memory circuit 103. By forming the sampling signal using the 32 kHz clock signals for the watch, a data receiving speed is defined at a maximum of 2400 bits per second. This is the maximum speed at which data can be received without error and this data is directly written into memory circuit 103 independently of the program controlling CPU 102. A memory circuit 103 having a capacity of 2K bits receives data sufficient to completely fill memory circuit 103 in about ten seconds. As a result, a receiving speed of 2400 bits per second is an acceptable speed in practice. However, in order to insure the data transmission speed of 2400 bits per second, the contents of the data are not processed at the time of receipt. In other words, the data with a predetermined structure established by the external information device is directly input into memory circuit 103.

When the structure of the data input from the external information device is different from the predetermined data structure, the input data is not correctly completed, or the contents of memory circuit 103 are erased, such as when the batteries are changed, CPU 102 modifies the data structure in memory circuit 103 into a proper data structure.

Figure 6:
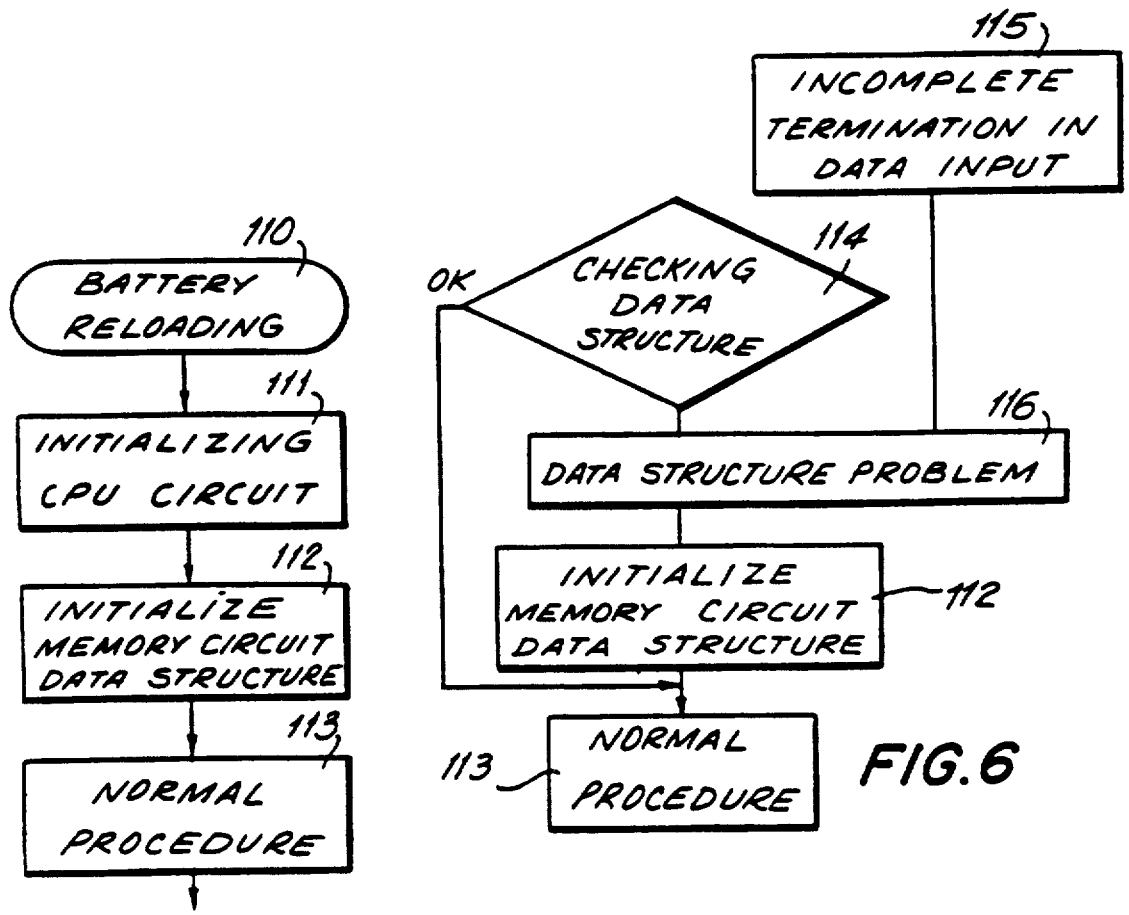
FIG. 6 is a flow-chart exemplifying the control procedure utilized in the portable compact device of FIG. 5.
Figure 8:
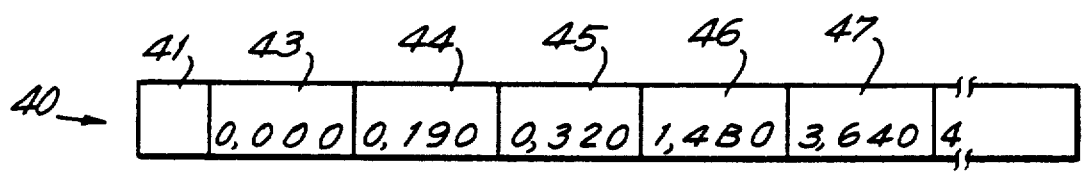
FIG. 8 is a memory map of the memory circuit showing the initialized state of the data used in accordance with the second embodiment of the invention.
Figure 8:
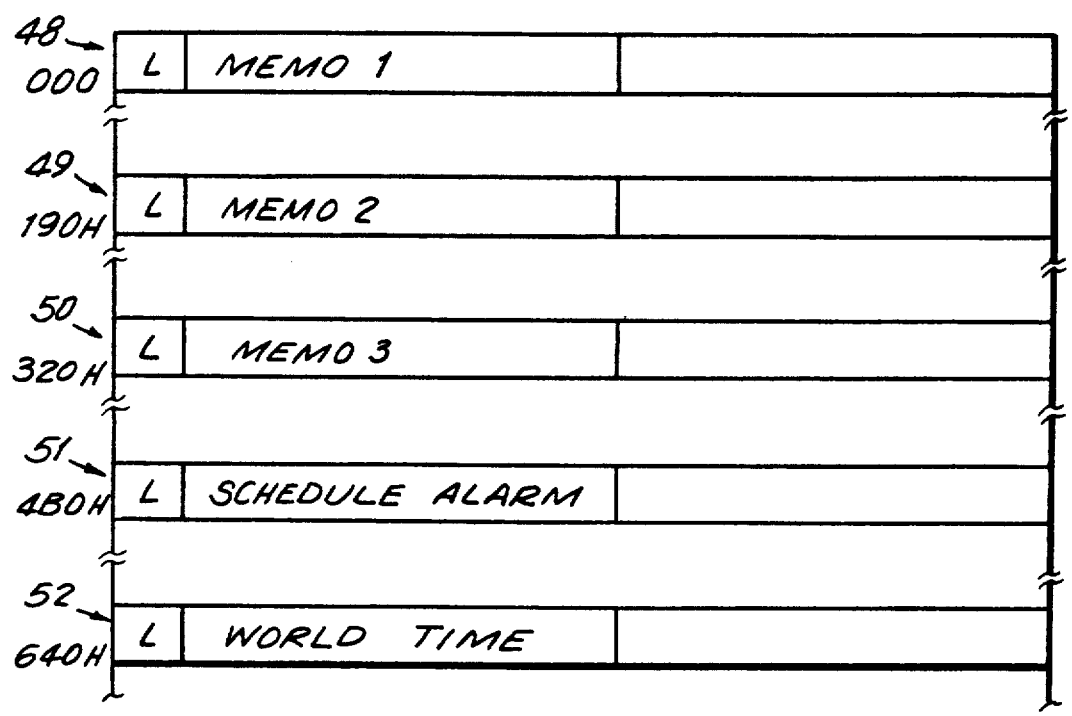

Reference is made to FIG. 6 wherein a flow-chart showing the correction procedures taken by CPU 102 are depicted. When the battery is reloaded (block 110), the CPU circuit is initialized (block 111) and then the data structure in memory circuit 103 is initialized (block 112). Finally, the device returns to its normal procedure (block 113).

Similarly, when the data input is not correctly terminated (block 115) or when the data structure check (block 114) determines that there are abnormalities in the data structure (data structure problem block 116), the data structure of memory circuit 103 is initialized (block 112). Finally, the device returns to normal procedure 113.

Figure 1:
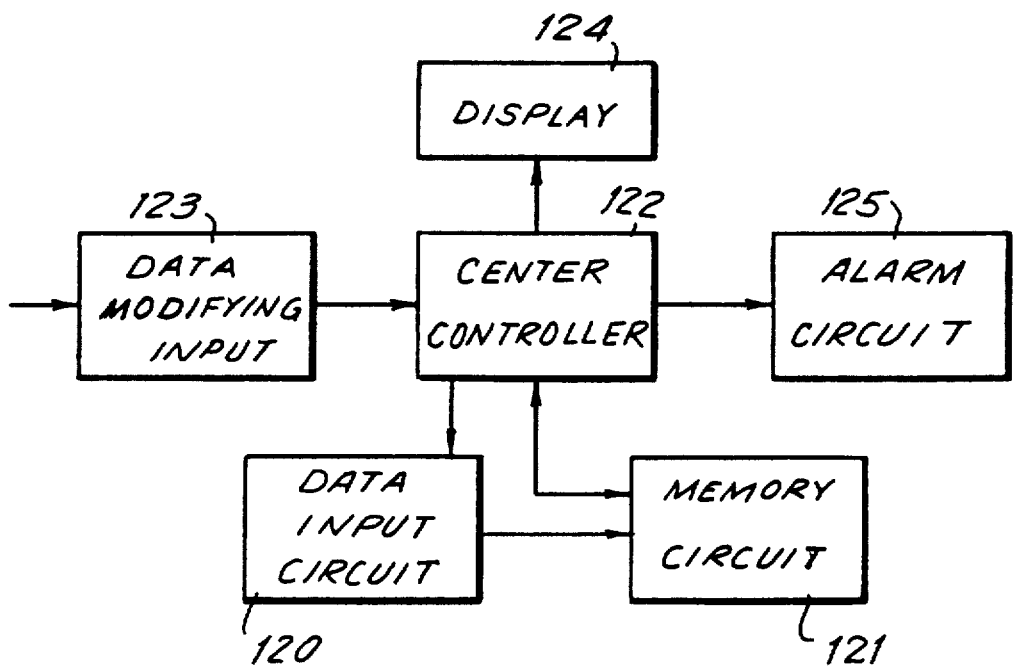
FIG. 1 is a schematic block diagram of a portable compact device constructed in accordance with the prior art.
Figure 7:
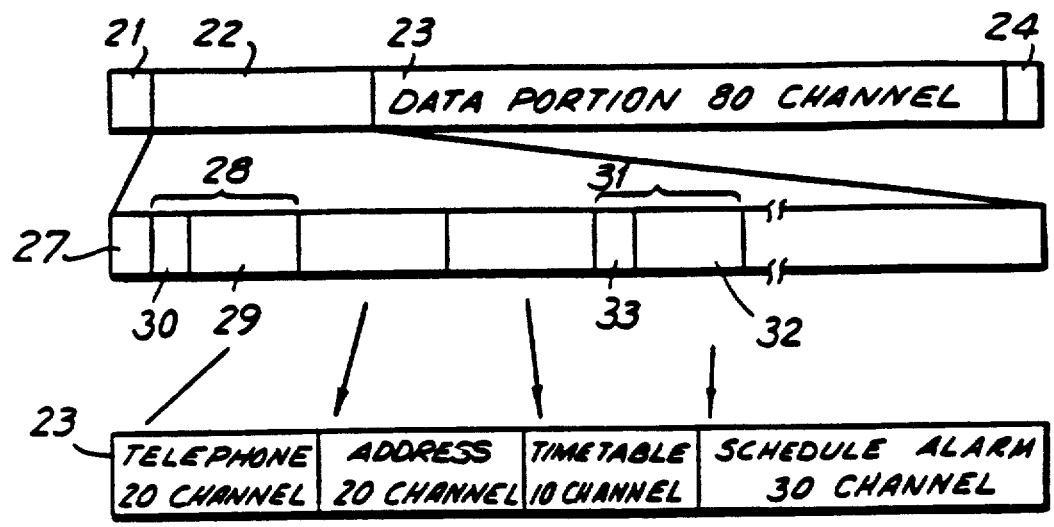
FIG. 7 is a memory map of the memory circuit of the portable compact device of FIG. 5 showing the data structure.
Figure 2:
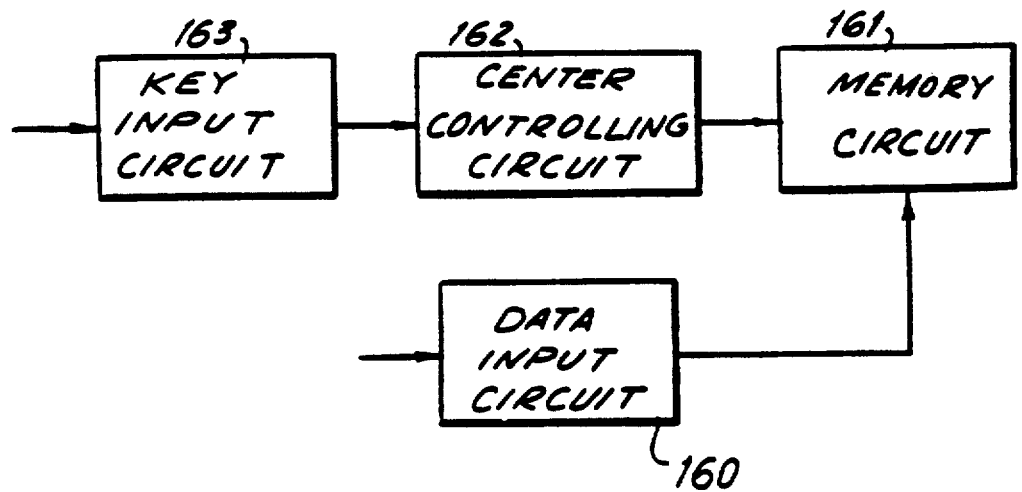
FIG. 2 is a second schematic block diagram of the portable compact device of FIG. 1 constructed in accordance with the prior art.

Reference is next made to FIG. 7 wherein a data structure used in accordance with the second embodiment of the invention is depicted. Segment 21 is the data structure indicating segment. Segment 22 represents the data address indicating portion, which is representative of the stored addresses and types of input data. Segment 23 includes the actual data and finally, segment 24 is a data termination indicating portion indicating the end of a data input. Segment 23 consists of the data of up to eighty channels. Twenty-five letters in eighty channels can be arbitrarily allocated for memo data, scheduled alarm data, world time data and so forth. The types and addresses of the data are indicated in the data address indicating segment 22.

For example, when data consisting of twenty channels of telephone numbers, twenty channels of addresses, ten channels of timetables and thirty channels of scheduled alarm information are input from the external information device, the contents of data address indicating segment 22 is shown by block 27. Sub-segment 28 includes a data type indicator field 30 and a starting address pointer field 29 which points to the beginning of the telephone data in segment 23 of the memory. Sub-segment 31 consists of a data type indication field 33 indicating that sub-segment 31 points to memo data and field 32 points to the address in segment 23 at which the memo data begins. Likewise, segment 22 is composed of two fields for each of the eighty channels in data segment 23. Each group of two fields includes a data type indicator and an address pointer pointing to the address of the beginning of the indicated data in segment 23.

When data is processed by CPU 102, the type and starting address of each type of data is known from the contents of data address indicating portion 22. As a result, data of the desired type may be accessed at high speed. For example, in order to check the alarm-setting time, the CPU checks the contents of data address indicating portion 22, seeking out field 33 which indicates that the following address (field 32) is the starting address of a scheduled alarm data. Then, the time data and the alarm-setting time are checked. If the time data coincides with the alarm data the alarm sound is produced and simultaneously the alarm comment data is displayed.

During the usual data searching operation the address of the first record of each type of data is obtained by using the data address indicating portion 22 which is displayed. In order to correct the data, a correcting routine for each data type is selected in accordance with the type of data input indicated in data address indicating portion 22. For example, the memo data has all data corrected as letter data. For scheduled alarm data, the data is divided into alarm comment data of a letter type and alarm-setting time data of a numeric type. The alarm-setting time data is corrected in the same manner as any time indication.

After receiving data, the data check 114 (FIG. 6) is also performed when using the data structure shown in FIG. 7 and described above. First, the address of the initial bit of data is obtained from the appropriate fields (29, 32) in data address indicating segment 22 and a review is made of the data written in the pointed-to initial data address. If the contents of the type of reviewed data coincides with the prescribed format for such data, the structure of the data is determined to be correct.

As a result, the data structure is essential to processing the data at low power and high speed. Since CPU 102 is unable to process data when the data structure disappears, the data structure must always be initialized to a proper, predetermined structure. As shown in FIG. 6, the initialization of the CPU and memory circuit is performed before processing begins. This initialization process classifies the data available to be placed in eighty channels among the various data types in a predetermined allocation so that the data may be easily used. This initialization data is previously stored in CPU 102 as a pre-programmed data.

Reference is made to FIG. 6 wherein the contents of memory circuit 103 after the data structure is initialized is shown Block 40 corresponds to segments 21, 22, 23 and 24 shown in FIG. 7. Sub-segments 43-47 are two field sub-segments in segment 22 (FIG. 7), and point to three memo records, a scheduled alarm record and a world time record stored in memory circuit 103. For example, the first numeral of sub-segment 43 (numeral 0) indicates that the record is a memo type while the last three numerals (000H) point to memory address 000H. Likewise, sub-segments 44 and 45 are also memo type record which start at memory locations 190H and 320H, respectively. Sub-segment 46 identifies the data as scheduled alarm (the first numeral is 1), and points to address 4B0H. Likewise, sub-segment 47 is identified as world time data by the first numeral (3) and points to address 640H. The initial part of the data in the records associated with sub-segments 48-52 includes data for checking the structure of the data and a comment indicating the type of data. By initializing memory 103 as described above, the data correction and retrieval of data stored in memory circuit 103 is quickly and accurately performed.

Accordingly, by providing a data structure initializing procedure in the portable compact device, the data stored in the data memory circuit is processed and corrected in the same manner as data input from an external information device. Moreover, even if no data is input from an external information device, the stored data can be corrected by inputting the correction data without modifying other system components.

Accordingly, an improved portable device which is capable of initializing the memory to allow for input and modification of data directly input from the compact portable device is provided. Also, correction of data to allow processing of data when the batteries are changed or incomplete data transmission from an external device is present is provided.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A portable compact device for use with an external device supplying input data having a data structure consisting of said input data and associated indicating data which indicates the data type and stored address for the input data comprising:
    interface means for providing an interface between an external device and the portable compact device;
    data memory means for storing the input data received by said interface means at an address corresponding to the indicating data;
    processing means coupled to the data memory means for receiving and sending the data between said interface means and said data memory means, the processing means including;
    control means for processing data stored in the data memory means in accordance with the indicating data and determining whether the data structure in the data memory means allows for the processing of the input data by the control means; and
    initializing means for establishing an initialized data structure in the data memory means when the control means determines that the data structure does not allow for the processing of the input data, the initialized data structure corresponding to an indicating data which indicates the data type and stored address which allows for the processing of the data stored in the data memory means.

2. The portable compact device of claim 1 wherein the initializing means establishes a data structure inn the data memory means so that even when no data is input from the interface means the data inn the data memory means may be processed by the control means.

3. The portable device of clam 1 wherein the processing means includes detecting means for detecting data structure in the data memory means different from the desired stored data structure and correcting means for establishing the stored data in the data memory means in the desired data structure.

4. The portable compact device of claim 1 wherein the stored data structure allocates storage space in the data memory means between records of different types.

5. The portable compact device of claim 1 further including data modifying means coupled to the data memory means for modifying said stored data wherein the data modifying means includes a key input.

6. The portable compact device of claim 1 further including display means coupled to the control means for displaying data stored in the data memory means.

7. The portable compact device of claim 1 wherein the stored data structure includes a first segment having at least one record type field for identifying a type of record and a second segment for storing data for the record.

8. The portable compact device of claim 7 wherein the first segment further includes a pointer field associated with each record type field for pointing to the address of a record in the second segment corresponding to the associated record type field.

9. The portable compact device of claim 1 wherein the data memory means is a memory circuit.

10. The portable compact device of claim 9 wherein the memory circuit has a capacity of 2K bytes.

11. The portable compact device of claim 1 wherein the initializing means establishes the stored data structure in the data memory means.

12. The portable compact device of claim 11 wherein the stored data structure includes a first segment having at least one record type field for identifying a type of record and a second segment for storing data for the record.

13. The portable compact device of claim 12 wherein the first segment further includes a pointer field associated with each record type field for pointing to the address of a record in the second segment corresponding to the associated record type field.

14. The portable compact device of claim 13 wherein the stored data structure allocates storage space in the data memory means between records of different types.

15. The portable compact device of claim 1, wherein the portable compact device includes a power source means, said initializing means automatically operating after a discontinuation of said power source means and when incomplete data is input.

* * * * *